(12) United States Patent
Yang (10) Patent No.: US 11,215,983 B2
(45) Date of Patent: Jan. 4, 2022

(54) REMOTE CONTROL DEVICE AND REMOTE CONTROL METHOD FOR AUTOMATIC DRIVING VEHICLE, AND SERVER

(71) Applicant: BAIDU ONLINE NETWORK TECHNOLOGY (BEIJING) CO., LTD., Beijing (CN)

(72) Inventor: Jialin Yang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/554,073

(22) Filed: Aug. 28, 2019

(65) Prior Publication Data

US 2020/0073376 A1    Mar. 5, 2020

(30) Foreign Application Priority Data

Aug. 31, 2018  (CN) .......................... 201811008192.5

(51) Int. Cl.
*G05D 1/00*   (2006.01)
*H04L 29/08*  (2006.01)

(52) U.S. Cl.
CPC ......... *G05D 1/0022* (2013.01); *G05D 1/0011* (2013.01); *H04L 67/125* (2013.01); *H04L 67/18* (2013.01); *G05D 2201/0213* (2013.01)

(58) Field of Classification Search
CPC ............... G05D 1/0022; G05D 1/0011; G05D 2201/0213; H04L 67/125; H04L 67/18
See application file for complete search history.

(56) References Cited

U.S. PATENT DOCUMENTS

| | | | |
|---|---|---|---|
| 7,616,960 B2 * | 11/2009 | Anke | H04W 72/10 370/235 |
| 8,738,197 B2 * | 5/2014 | An | G05D 1/0285 701/2 |
| 9,626,874 B1 | 4/2017 | Gupta et al. | |
| 10,609,555 B2 * | 3/2020 | Villar | H04L 9/0819 |
| 2008/0137602 A1 * | 6/2008 | Khivesara | H04L 12/1881 370/329 |
| 2011/0125344 A1 | 5/2011 | An et al. | |

(Continued)

FOREIGN PATENT DOCUMENTS

| | | |
|---|---|---|
| CN | 104428826 A | 3/2015 |
| CN | 105052203 A | 11/2015 |

(Continued)

OTHER PUBLICATIONS

European Patent Application No. 19193024.7 extended Search and Opinion dated Dec. 9, 2019, 6 pages.

(Continued)

*Primary Examiner* — Adam R Mott
*Assistant Examiner* — Frank T Glenn, III
(74) *Attorney, Agent, or Firm* — Lathrop GPM LLP (57) ABSTRACT

The present disclosure provides a server, a remote control device and a remote control method for an automatic driving vehicle. The method includes: after receiving a remote control request of an automatic driving vehicle, determining a control instruction according to the remote control request, and transmitting the control instruction by using wireless channels corresponding to a plurality of wireless networks.

12 Claims, 6 Drawing Sheets

(56) References Cited

U.S. PATENT DOCUMENTS

| | | | | |
|---|---|---|---|---|
| 2014/0215491 | A1* | 7/2014 | Addepalli | H04L 67/12 |
| | | | | 719/313 |
| 2017/0223712 | A1* | 8/2017 | Stephens et al. | H04L 67/125 |
| 2018/0147721 | A1 | 5/2018 | Griffin et al. | |
| 2018/0232839 | A1* | 8/2018 | Heinla | G06Q 10/0832 |
| 2019/0236962 | A1* | 8/2019 | Tholen | G05D 1/101 |

FOREIGN PATENT DOCUMENTS

| | | |
|---|---|---|
| CN | 106664538 A | 5/2017 |
| CN | 107045350 A | 8/2017 |
| JP | 2012134753 A | 7/2012 |
| JP | 2014109940 A | 6/2014 |
| JP | 2017523651 A | 8/2017 |
| JP | 201811284 A | 1/2018 |
| JP | 2018005880 A | 1/2018 |
| JP | 2018018284 A | 2/2018 |
| JP | 2018514834 A | 6/2018 |
| WO | WO 2017064202 A1 | 4/2017 |

OTHER PUBLICATIONS

Chinese Patent Application No. 201811008192.5 First Office Action dated Jun. 28, 2020, 9 pages.
Chinese Patent Application No. 201811008192.5 English translation of First Office Action dated Jun. 28, 2020, 7 pages.
Japanese Patent Application No. 2019140430 First Office Action dated Sep. 1, 2020, 3 pages.
Japanese Patent Application No. 2019140430 English translation of First Office Action dated Sep. 1, 2020, 3 pages.

\* cited by examiner

REMOTE CONTROL DEVICE AND REMOTE CONTROL METHOD FOR AUTOMATIC DRIVING VEHICLE, AND SERVER

CROSS REFERENCE TO RELATED APPLICATIONS

This application is based on and claims priority to Chinese patent application Serial No. 201811008192.5, filed on Aug. 31, 2018, the entire contents of which are incorporated herein by reference.

TECHNICAL FIELD

The present disclosure relates to a field of automatic driving technology, and more particularly, to a server, a remote control device and a remote control method for an automatic driving vehicle.

BACKGROUND

Currently, in a field of automatic driving, when an automatic driving vehicle encounters extreme conditions, for example, technical failure, sudden speed acceleration or deceleration caused by unexplained reasons, and in a close distance to the obstacle, a remote manual driving mode is required to help the automatic driving vehicle out of the extreme conditions.

In the related art, a remote control terminal usually adopts a wireless channel of a single fixed network to remotely interact with the automatic driving vehicle, so as to manually control the automatic driving vehicle. However, since the network environment is affected by many factors, the wireless communication delay between the remote control terminal and the automatic driving vehicle is unstable, and the control instruction of the remote control terminal cannot be transmitted to the automatic driving vehicle in time, such that the response operation of the autonomous vehicle is limited and the driving safety of the vehicle is affected.

SUMMARY

The present disclosure aims to solve at least one of the above problems to at least some extent.

Embodiments of a first aspect of the present disclosure provide a remote control method for an automatic driving vehicle. The method is applied to a server and includes: receiving a remote control request transmitted by an automatic driving vehicle; determining a control instruction based on information carried by the remote control request; and transmitting the control instruction to the automatic driving vehicle by using wireless channels corresponding to a plurality of wireless networks.

Embodiments of a second aspect of the present disclosure provide a remote control device for an automatic driving vehicle. The device includes: a processor and a memory configured to store software modules executable by the processor. The processor is configured to run a program corresponding to the software modules by reading the software modules stored in the memory. The software modules include: a receiving module, configured to receive a remote control request transmitted by an automatic driving vehicle; a first determining module, configured to determine a control instruction based on information carried by the remote control request; and a transmitting module, configured to transmit the control instruction to the automatic driving vehicle by using wireless channels corresponding to a plurality of wireless networks.

Embodiments of a third aspect of the present disclosure provide a server. The server includes a processor and a memory. The processor is configured to run a program corresponding to executable program codes by reading the executable program codes stored in the memory, such that the remote control method for the autonomous vehicle according to the above embodiments is implemented.

Embodiments of a fourth aspect of the present disclosure provide a remote control system. The system includes a server and an automatic driving vehicle. The server is configured to receive a remote control request transmitted by the automatic driving vehicle, to determine a control instruction according to the information carried by the remote control request, and to transmit the control instruction to the automatic driving vehicle by using wireless channels corresponding to a plurality of wireless networks. The automatic driving vehicle is configured to transmit the remote control request to the server, and to receive the control instruction transmitted by the server.

To achieve the above objectives, embodiments of a fifth aspect of the present disclosure provide a non-transitory computer readable storage medium having a computer program stored thereon. When the computer program is executed by a processor, the remote control method for an automatic driving vehicle according to embodiments of the present disclosure is implemented.

To achieve the above objectives, embodiments of a sixth aspect of the present disclosure provide a computer program product. When instructions in the computer program product is executed by a processor, the remote control method for an automatic driving vehicle according to embodiments of the present disclosure is implemented.

Additional aspects and advantages of the present disclosure will be given in the following description, some of which will become apparent from the following description or be learned from practices of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Embodiments of the present disclosure will be described below in detail, examples of which are illustrated in accompanying drawings. Throughout the drawings, the same or similar reference signs refer to the same or similar elements or elements that have the same or similar functions. The embodiments described below with reference to the accompanying drawings are merely exemplary and intends to illustrate and explain the present disclosure, and should not be construed as a limit to the present disclosure.

A remote control method, a remote control device, a server, and a remote control system for an automatic driving vehicle according to embodiments of the present disclosure are described below with reference to the accompanying drawings.

Figure 1:
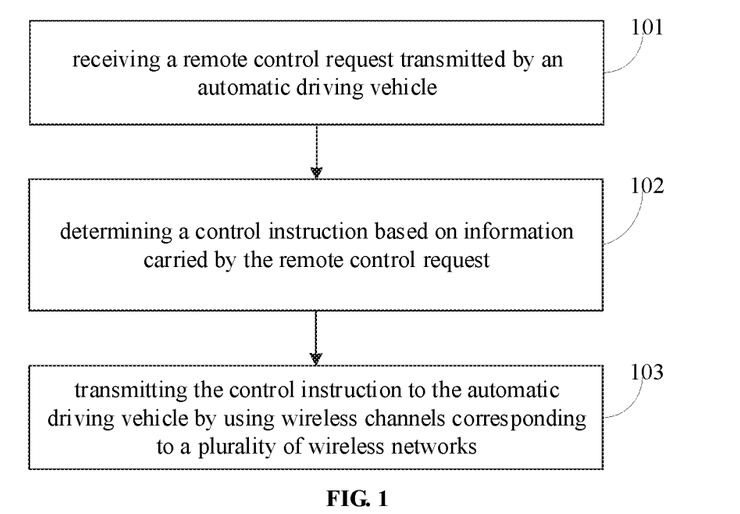
FIG. 1 is a flow chart of a remote control method for an automatic driving vehicle according to an embodiment of the present disclosure.

FIG. 1 is a flow chart of a remote control method for an automatic driving vehicle according to an embodiment of the present disclosure.

As illustrated in FIG. 1, the remote control method for an automatic driving vehicle may include the following steps.

At step 101, a remote control request transmitted by an automatic driving vehicle is received.

It should be noted that the remote control method for the automatic driving vehicle of this embodiment is applied to a remote control device for an automatic driving vehicle, and the remote control device for the automatic driving vehicle is disposed on a server.

Specifically, when the automatic driving vehicle determines that remote control is required, the automatic driving vehicle may transmit the remote control request to the server corresponding to remote control.

The situations in which the automatic driving vehicle requires the remote control include, but not limited to, the automatic driving vehicle encountering a condition outside the range of known driving conditions, a sudden speed acceleration or deceleration of the automatic driving vehicle, a malfunction of the automatic driving control strategy of the automatic driving vehicle, which is not limited in the embodiment.

For example, when the automatic driving vehicle encounters a strangely shaped obstacle on the front road, the automatic driving vehicle stops moving forward and transmits the remote control request to the server, such that the server controls the automatic driving vehicle to keep moving forward or change lanes.

At step 102, a control instruction is determined based on information carried by the remote control request.

The control instruction may be a lane changing instruction, a proceeding instruction, a driving mode adjusting instruction, and the like.

It should be noted that, in different scenarios, the actual situation of the automatic driving vehicle is different, the information carried by the remote control request corresponding to the situation is different, or the type of the remote control request transmitted is different, and thus, the determined control instruction according to the remote control request is also different. Therefore, in the actual application, the corresponding control instruction may be determined in combination with the actual situation of information carried in the remote control request sent by the automatic driving vehicle, which is not limited in the embodiment.

It should be understood that the information carried by the remote control request may include, but not limited to, the ambient environment information of the automatic driving vehicle or the vehicle state information, and the like, so that the server may determine the control instruction according to the surrounding environment information of the automatic driving vehicle and the vehicle state information.

At step 103, the control instruction is transmitted to the automatic driving vehicle by using wireless channels corresponding to a plurality of wireless networks.

The wireless network may be a mobile communication network. For example, the plurality of wireless networks may be a plurality of wireless networks provided by a plurality of different mobile communication service providers.

It should be noted that, after receiving the control instruction transmitted by any wireless network, the automatic driving vehicle perform operations corresponding to the control instruction.

After the automatic driving vehicle receives the control instruction transmitted by other wireless networks, the automatic driving vehicle acquires a vehicle state and determines whether to execute the control instruction based on the vehicle state. For example, if the control instruction instructs the automatic driving vehicle to change lanes, and the automatic driving vehicle has completed the lane changing operation according to the vehicle state, at this time, the automatic driving vehicle no longer performs the lane changing operation according to the control instruction.

With the remote control method for an automatic driving vehicle according to embodiments of the preset disclosure, after receiving the remote control request of the automatic driving vehicle, the control instruction is determined according to the remote control request, and the control instruction is transmitted by using wireless channels corresponding to the plurality of wireless networks. Thus, the control instruction is transmitted through the wireless channels corresponding to the plurality of different wireless networks, thereby realizing the redundant backup of the control instruction, avoiding the case that the automatic driving vehicle cannot receive the control instruction in time due to the instability of a single network, and improving the communication stability of communication with the automatic driving vehicle. In this way, the control instruction may reach the automatic driving vehicle in time, which enables the automatic driving vehicle to act rapidly in response to the control instruction and further improves the driving safety of the automatic driving vehicle.

Figure 2:
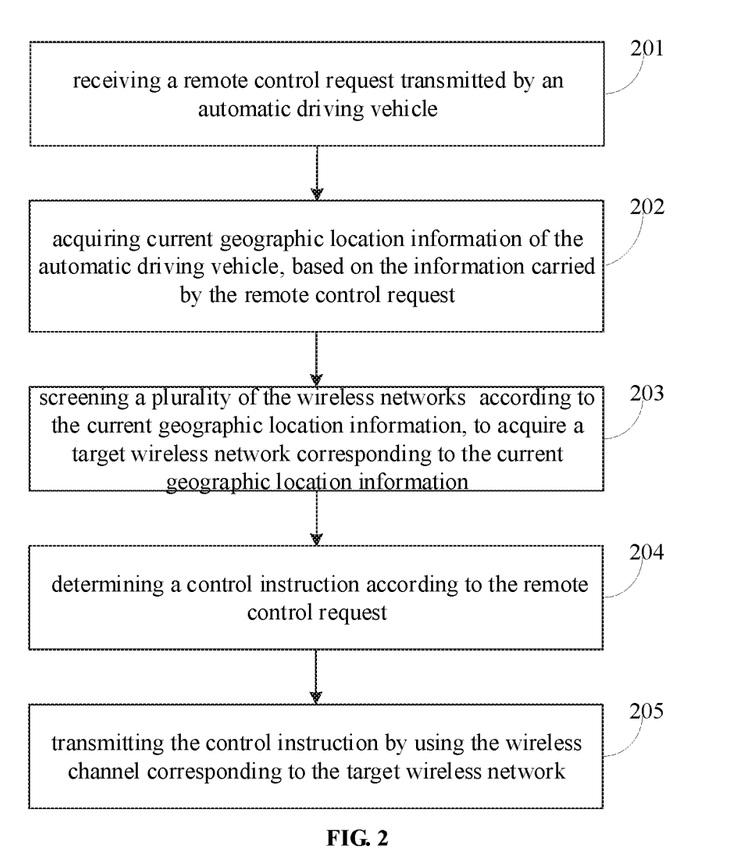
FIG. 2 is a flow chart of a remote control method for an automatic driving vehicle according to another embodiment of the present disclosure.

FIG. 2 is a flow chart of a remote control method for an automatic driving vehicle according to another embodiment of the present disclosure.

As illustrated in FIG. 2, the remote control method for an automatic driving vehicle may include the following steps.

At step 201, a remote control request transmitted by an automatic driving vehicle is received.

At step 202, current geographic location information of the automatic driving vehicle is acquired according to information carried by the remote control request.

It should be understood that, in different scenarios, the manner in which the current geographical location information of the automatic driving vehicle is acquired according to the information carried by the remote control request is different.

As an example, if the remote control request carries the vehicle identification information of the automatic driving vehicle, the server transmits a positioning request carrying the vehicle identification information to a location-based positioning server. Correspondingly, the positioning server acquires geographical location information corresponding to the vehicle identification information, and feeds back the geographical location information to the server. The geographical location information fed back by the positioning server is the current geographical location information of the automatic driving vehicle.

As another example, if the remote control request carries the vehicle identification information of the automatic driving vehicle, the server acquires the geographical location information corresponding to the vehicle identification information. The acquired geographical location information is the current geographical location information of the automatic driving vehicle.

As yet another example, if the remote control request carries the global positioning information of the automatic driving vehicle, the server acquires the geographical location information corresponding to the global positioning information. The acquired geographical location information is the current geographical location information of the automatic driving vehicle.

At step 203, a plurality of the wireless networks is screened according to the current geographic location information, to acquire a target wireless network corresponding to the current geographic location information.

It should be noted that different mobile communication service providers provide different network signal coverage at different geographical locations. Therefore, in order to enable the automatic driving vehicle located at the current geographic location to rapidly acquire the control instruction, as an exemplary implementation, a plurality of wireless networks may be screened according to the current geographic location information of the automatic driving vehicle to obtain a target wireless network.

Specifically, a plurality of wireless networks may be screened according to the pre-stored correspondence between geographic locations and wireless networks to obtain the target wireless network corresponding to the current geographic location.

It should be noted that the number of the target wireless network may be one or more.

At step 204, a control instruction is determined according to the remote control request.

At step 205, the control instruction is transmitted to the automatic driving vehicle by using a wireless channel corresponding to the target wireless network.

The wireless network may be a mobile communication network. For example, a plurality of wireless networks may be a plurality of wireless networks provided by a plurality of different mobile communication service providers.

It should be noted that, after the automatic driving vehicle receives the control instruction transmitted by any wireless network, the automatic driving vehicle performs operations corresponding to the control instruction.

After the automatic driving vehicle receives the control instruction transmitted by other wireless networks, the automatic driving vehicle acquires the vehicle state and determines whether to execute the control instruction based on the vehicle state. For example, if the control instruction instructs the automatic driving vehicle to change lanes, and the automatic driving vehicle has completed the lane changing operation according to the vehicle state, at this time, the automatic driving vehicle no longer performs the lane changing operation according to the control instruction.

With the remote control method for an automatic driving vehicle according to embodiments of the present disclosure, after receiving the remote control request of the automatic driving vehicle, current geographical location information of the automatic driving vehicle is acquired according to the information carried by the remote control request, and a plurality of wireless networks are screened according to the current geographic location information to acquire the target wireless network corresponding to the current geographic location information, and the control instruction corresponding to the remote control request is determined and transmitted by using a wireless channel corresponding to the target wireless network. Thus, a plurality of wireless networks are screened according to the current geographic location information of the automatic driving vehicle to acquire the target wireless network corresponding to the current geographic location information, and the control instruction is transmitted to the automatic driving vehicle through the wireless channel of the target wireless network. In this way, the communication stability of communication with the automatic driving vehicle is improved, the control instruction may reach the automatic driving vehicle in time, which enables the automatic driving vehicle to act rapidly in response to the control instruction and further improves the driving safety of the automatic driving vehicle.

Figure 3:
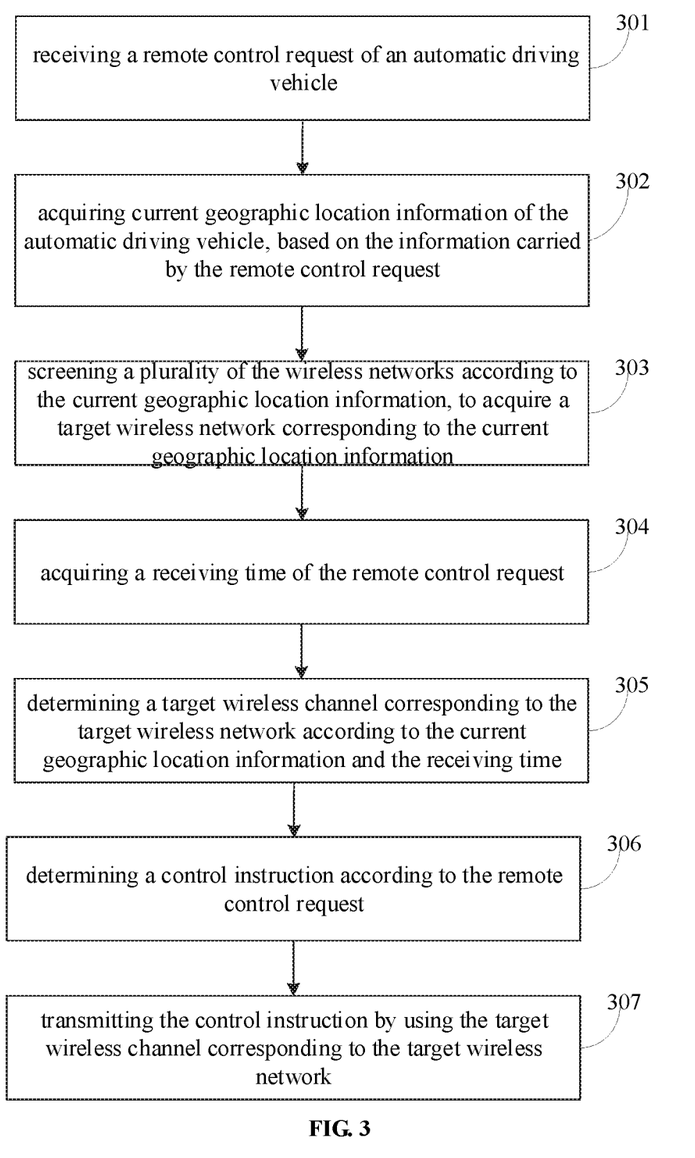
FIG. 3 is a flow chart of a remote control method for an automatic driving vehicle according to yet another embodiment of the present disclosure.

FIG. 3 is a flow chart of a remote control method for an automatic driving vehicle according to yet another embodiment of the present disclosure.

As illustrated in FIG. 3, the remote control method for an automatic driving vehicle may include the following steps.

At step 301, a remote control request transmitted by an automatic driving vehicle is received.

At step 302, current geographic location information of the automatic driving vehicle is acquired according to information carried by the remote control request.

At step 303, a plurality of wireless networks are screened according to the current geographic location information, to acquire a target wireless network corresponding to the current geographic location information.

It should be noted that different mobile communication service providers provide different network signal coverage at different geographical locations. Therefore, in order to enable the automatic driving vehicle located at the current geographic location to rapidly acquire the control instruction, as an exemplary implementation, a plurality of wireless networks may be screened according to the current geographic location information of the automatic driving vehicle to obtain a target wireless network.

Specifically, a plurality of wireless networks may be screened according to the pre-stored correspondence between geographic locations and wireless networks, to obtain the target wireless network corresponding to the current geographic location.

It should be noted that the number of the target wireless network may be one or more.

At step 304, a receiving time of the remote control request is acquired.

At step 305, a target wireless channel of the target wireless network is determined according to the receiving time and the current geographic location information.

It should be noted that, for a certain geographic location of a certain wireless network, the wireless channel used by the wireless network may be different in different time periods. Therefore, as an exemplary implementation, the target wireless channel of the target wireless network is determined according to the receiving time and the current geographic location information.

At step 306, a control instruction is determined according to the remote control request.

At step 307, the control instruction is transmitted to the automatic driving vehicle by using the target wireless channel of the target wireless network.

With the remote control method for an automatic driving vehicle according to embodiments of the present disclosure, after receiving a remote control request of an automatic driving vehicle, a plurality of wireless networks are screened according to the current geographic location information of the automatic driving vehicle to acquire a target wireless network corresponding to the current geographic location information, the wireless channel used by the target wireless network is determined according to the receiving time to acquire the wireless channel suitable for both the receiving time and the current geographic location, and the control instruction is transmitted to the automatic driving vehicle by using the target wireless channel corresponding to the target wireless network. In this way, the communication stability of communication with the automatic driving vehicle is improved, the control instruction may reach the automatic driving vehicle in time, which enables the automatic driving vehicle to act rapidly in response to the control instruction and further improves the driving safety of the automatic driving vehicle.

Figure 4:
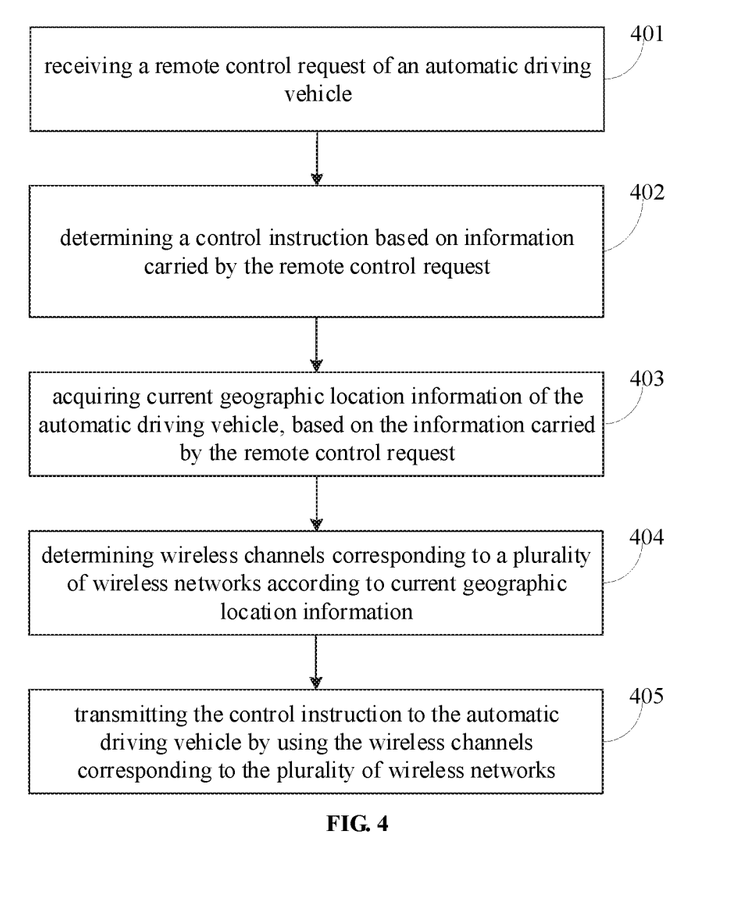
FIG. 4 is a flow chart of a remote control method for an automatic driving vehicle according to still another embodiment of the present disclosure.

FIG. 4 is a schematic block diagram of a remote control device for an automatic driving vehicle according to still another embodiment of the present disclosure.

As illustrated in FIG. 4, the remote control method for an automatic driving vehicle may include the following steps.

At step 401, a remote control request transmitted by an automatic driving vehicle is received.

At step 402, a control instruction corresponding to the remote control request is determined according to the information carried by the remote control request.

At step 403, current geographic location information of the automatic driving vehicle is acquired based on the information carried by the remote control request.

At step 404, a wireless channel corresponding to each of a plurality of wireless networks is determined according to the current geographic location information.

It should be noted that, for each wireless network, in order to provide high-speed network service to users located at a certain geographic location, the wireless channels used by each wireless network at different geographical locations may be different. Therefore, as an exemplary implementation, the wireless channel corresponding to each of the wireless networks is determined according to the current geographic location information. Thus, for each wireless network, the wireless channel suitable for use by the current wireless network at the current geographic location is acquired.

At step 405, the control instruction is transmitted to the automatic driving vehicle by using wireless channels corresponding to the plurality of wireless networks.

With the remote control method for an automatic driving vehicle according to embodiments of the present disclosure, after receiving a remote control request of an automatic driving vehicle, the current geographical location information of the automatic driving vehicle is acquired according to the information carried by the remote control request, and a plurality of wireless channels used by the wireless networks are screened according to the current geographic location information to acquire the wireless channel corresponding to the current geographic location information, and then the control instruction is determined corresponding to the remote control request and transmitted by using the wireless channels corresponding to each of the target wireless networks, thereby realizing the redundant backup of the control instruction, avoiding the case that the automatic driving vehicle cannot receive the control instruction in time due to the instability of a single network, and improving the communication stability of communication with the automatic driving vehicle. In this way, the control instruction may reach the automatic driving vehicle in time, which enables the automatic driving vehicle to act rapidly in response to the control instruction and further improves the driving safety of the automatic driving vehicle.

Figure 5:
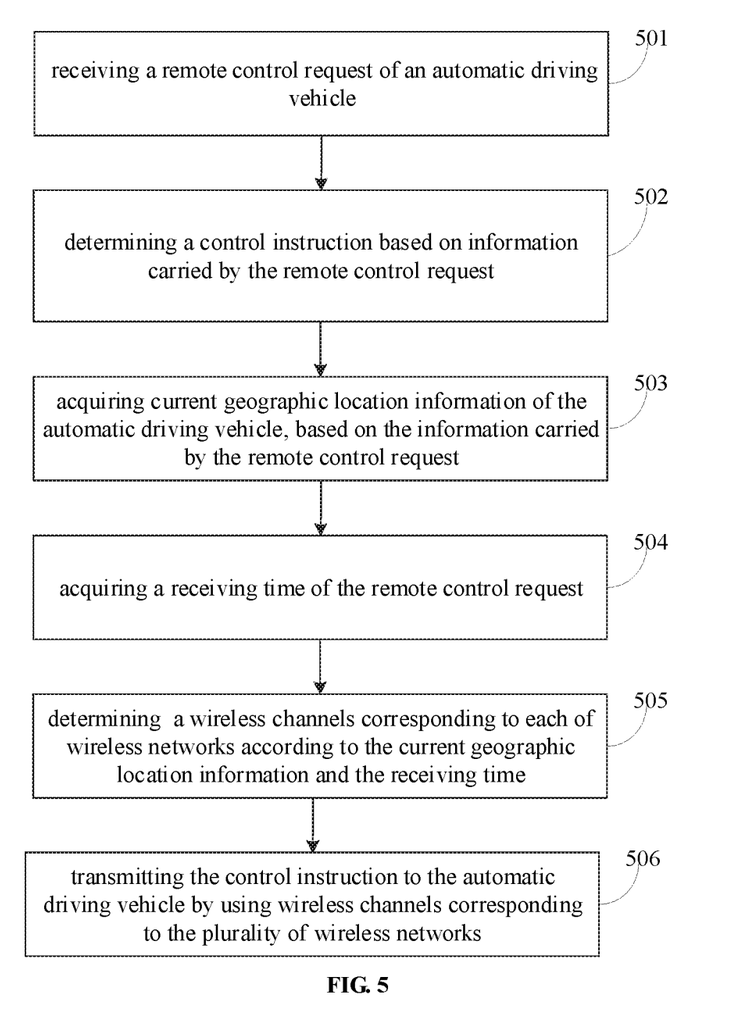
FIG. 5 is a flow chart of a remote control method for an automatic driving vehicle according to still yet another embodiment of the present disclosure.

FIG. 5 is a flow chart of a remote control method for an automatic driving vehicle according to still yet another embodiment of the present disclosure.

As illustrated in FIG. 5, the remote control method for an automatic driving vehicle may include the following steps.

At step 501, a remote control request transmitted by an automatic driving vehicle is received.

At step 502, a control instruction corresponding to the remote control request is determined according to the information carried by the remote control request.

At step 503, current geographic location information of the automatic driving vehicle is acquired based on the information carried by the remote control request.

At step 504, a receiving time of the remote control request is acquired.

At step 505, a wireless channel corresponding to each of the wireless networks is determined according to the receiving time and the current geographic location information.

It should be noted that, for each wireless network, in order to provide high-speed network service to users located at a certain geographic location, the wireless channels used by each wireless network at different geographical locations and during different time periods may be different. Therefore, as an exemplary implementation, the wireless channel corresponding to each of the wireless network is determined according to the current geographic location information and the receiving time. Thus, for each wireless network, a wireless channel suitable for use by the current wireless network at the current geographic location during the time period in which the receiving time is included is acquired.

At step 506, the control instruction is transmitted to the automatic driving vehicle by using the wireless channel corresponding to each of the wireless networks.

With the remote control method for an automatic driving vehicle according to embodiments of the present disclosure, after receiving a remote control request of an automatic driving vehicle, the wireless channel used by each of the wireless networks is determined according to the current geographic location information of the automatic driving vehicle in combination with the receiving time of receiving the remote control request, and the control instruction is determined according to the remote control request and transmitted by using the wireless channel corresponding to each of the wireless networks. Thus, the control instruction is transmitted by the wireless channel corresponding to the current geographic location and the receiving time, such that the communication stability of communication with the automatic driving vehicle is improved, the control instruction may reach the automatic driving vehicle in time, which enables the automatic driving vehicle to act rapidly in response to the control instruction and further improves the driving safety of the automatic driving vehicle.

To realize the above embodiments, the present disclosure further provides a remote control device for an automatic driving vehicle.

Figure 6:
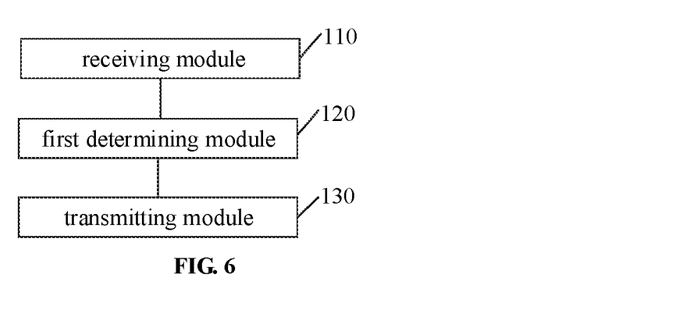
FIG. 6 is a schematic block diagram of a remote control device for an automatic driving vehicle according to an embodiment of the present disclosure.

FIG. 6 is a schematic block diagram of a remote control device for an automatic driving vehicle according to an embodiment of the present disclosure.

As illustrated in FIG. 6, the remote control device for an automatic driving vehicle includes a receiving module 110, a first determining module 120, and a transmitting module 130.

The receiving module 110 is configured to receive a remote control request transmitted by an automatic driving vehicle.

The first determining module 120 is configured to determine a control instruction based on information carried by the remote control request.

The transmitting module 130 is configured to transmit the control instruction to the automatic driving vehicle by using wireless channels corresponding to a plurality of wireless networks.

The wireless network may be a mobile communication network. For example, a plurality of wireless networks may be a plurality of wireless networks provided by a plurality of different mobile communication service providers.

It should be noted that the foregoing illustration of the embodiments of the remote control method for the automatic driving vehicle is also applicable to the remote control device of the automatic driving vehicle according to the embodiment, and details are not described herein again.

With the remote control device for an automatic driving vehicle according to embodiments of the present disclosure, after receiving a remote control request of an automatic driving vehicle, a control instruction is determined according to the remote control request, and the control instruction is transmitted by using wireless channels corresponding to a plurality of wireless networks. Thus, the control instruction is transmitted through the wireless channels corresponding to the plurality of different wireless networks, thereby realizing the redundant backup of the control instruction, avoiding the case that the automatic driving vehicle cannot receive the control instruction in time due to the instability of a single network, and improving the communication stability of communication with the automatic driving vehicle. In this way, the control instruction may reach the automatic driving vehicle in time, which enables the automatic driving vehicle to act rapidly in response to the control instruction and further improves the driving safety of the automatic driving vehicle.

Figure 7:
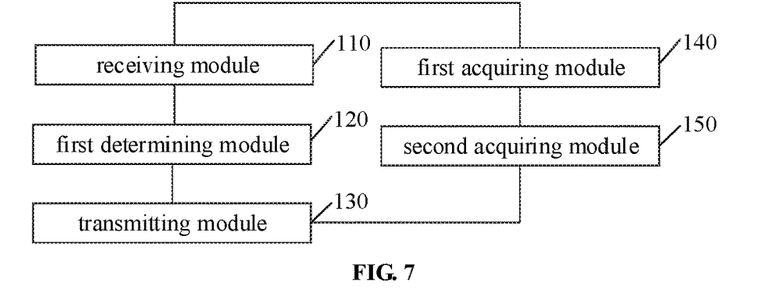
FIG. 7 is a schematic block diagram of a remote control device for an automatic driving vehicle according to another embodiment of the present disclosure.

In an embodiment of the present disclosure, on the basis of FIG. 6, as illustrated in FIG. 7, the device may further include a first acquiring module 140, and a second acquiring module 150.

The first acquiring module 140 is configured to acquire current geographic location information of the automatic driving vehicle according to information carried by the remote control request.

The second acquiring module 150 is configured to screen the plurality of wireless networks according to the current geographic location information, to acquire a target wireless network corresponding to the current geographic location information.

The transmitting module 130 is specifically configured to transmit the control instruction to the automatic driving vehicle by using the wireless channel corresponding to the target wireless network.

In this example, a plurality of wireless networks are screened according to the current geographic location information of the automatic driving vehicle to acquire a target wireless network corresponding to the current geographic location information, and the control instruction is transmitted to the automatic driving vehicle through the wireless channel of the target wireless network. In this way, the communication stability of communication with the automatic driving vehicle is further improved, such that the control instruction may reach the automatic driving vehicle in time, which enables the automatic driving vehicle to act rapidly in response to the control instruction and further improves the driving safety of the automatic driving vehicle.

Figure 8:
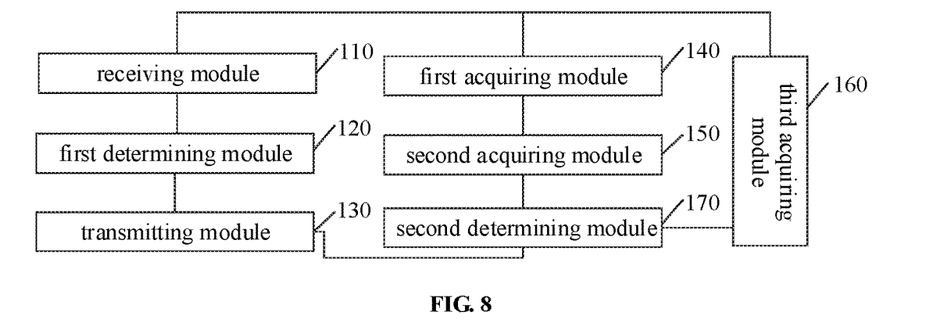
FIG. 8 is a schematic block diagram of a remote control device for an automatic driving vehicle according to yet another embodiment of the present disclosure.

In an embodiment of the present disclosure, on the basis of FIG. 7, as illustrated in FIG. 8, the device may further include a third acquiring module 160, and a second determining module 170.

The third acquiring module 160 is configured to acquire a receiving time of the remote control request.

The second determining module 170 is configured to determine a target wireless channel corresponding to the target wireless network according to the current geographic location information and the receiving time.

The transmitting module 130 is specifically configured to transmit the control instruction to the automatic driving vehicle by using the target wireless channel corresponding to the target wireless network.

In this example, after receiving a remote control request of an automatic driving vehicle, a plurality of wireless networks are screened according to the current geographic location information of the automatic driving vehicle to acquire a target wireless network corresponding to the current geographic location information, and wireless channels used by the target wireless network are screened according to the receiving time to acquire a wireless channel suitable for the receiving time and the current geographic location, and the control instruction is transmitted to the automatic driving vehicle through the target wireless channel of the target wireless network. In this way, the communication stability of communication with the automatic driving vehicle is further improved, such that the control instruction may reach the automatic driving vehicle in time, which enables the automatic driving vehicle to act rapidly in response to the control instruction and further improves the driving safety of the automatic driving vehicle.

Figure 9:
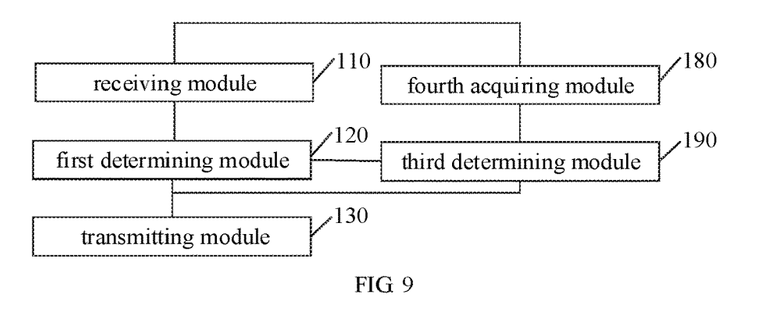
FIG. 9 is a schematic block diagram of a remote control device for an automatic driving vehicle according to still another embodiment of the present disclosure.

In an embodiment of the present disclosure, on the basis of FIG. 6, as illustrated in FIG. 9, the device may further include a fourth acquiring module 180, and a third determining module 190.

The fourth acquiring module 180 is configured to acquire current geographic location information of the automatic driving vehicle according to information carried by the remote control request.

The third determining module 190 is configured to determine the wireless channels corresponding to each of the plurality of wireless networks based on the current geographic location information, before the transmitting module transmits the control instruction to the automatic driving vehicle by using the wireless channels corresponding to the plurality of the wireless networks.

In this example, after receiving a remote control request of an automatic driving vehicle, current geographical location information of the automatic driving vehicle is acquired according to the information carried by the remote control request, and a plurality of wireless channels used by each of the wireless networks are screened according to the current geographic location information to acquire a wireless channel corresponding to the current geographic location information, and the control instruction is determined according to the remote control request and transmitted by using the wireless channels corresponding to the target wireless networks, thereby realizing the redundant backup of the control instruction, avoiding the case that the automatic driving vehicle cannot receive the control instruction in time due to the instability of a single network, and improving the communication stability of communication with the automatic driving vehicle. In this way, the control instruction may reach the automatic driving vehicle in time, which enables the automatic driving vehicle to act rapidly in response to the control instruction, improving the driving safety of the automatic driving vehicle.

Figure 10:
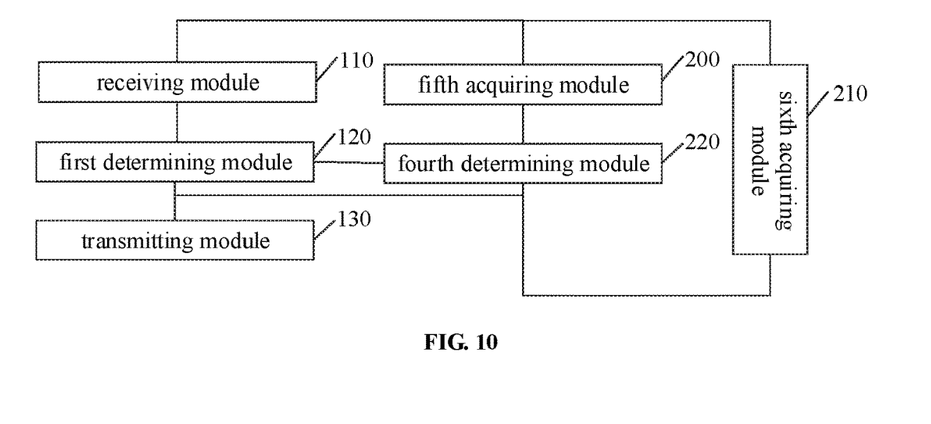
FIG. 10 is a schematic block diagram of a remote control device for an automatic driving vehicle according to still yet another embodiment of the present disclosure.

In an embodiment of the present disclosure, on the basis of FIG. 6, as illustrated in FIG. 10, the device may further include a fifth acquiring module 200, a sixth acquiring module 210, and a fourth determining module 220.

The fifth acquiring module 200 is configured to acquire current geographic location information of the automatic driving vehicle according to information carried by the remote control request.

The sixth acquiring module 210 is configured to acquire a receiving time of the remote control request.

The fourth determining module 220 is configured to determine a wireless channel corresponding to each of the plurality of wireless networks based on the current geographic location information and the receiving time, before the transmitting module transmits the control instruction to the automatic driving vehicle by using the wireless channels corresponding to the plurality of the wireless networks.

In this example, after receiving a remote control request of an automatic driving vehicle, the wireless channel used by each of the plurality of wireless networks is determined according to the current geographic location information of the automatic driving vehicle in combination with the receiving time of receiving the remote control request, and the control instruction is determined according to the remote control request and transmitted by using the wireless channel corresponding to each of the wireless networks. Thus, the control instruction is transmitted by the wireless channel corresponding to the current geographic location and the receiving time, such that the communication stability of communication with the automatic driving vehicle is further improved, and the control instruction may reach the automatic driving vehicle in time, which enables the automatic driving vehicle to act rapidly in response to the control instruction and further improves the driving safety of the automatic driving vehicle.

In order to achieve the above embodiments, the present disclosure further provides a server.

Figure 11:
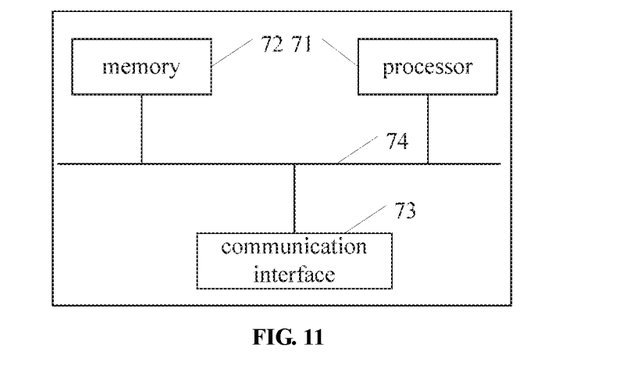
FIG. 11 is a schematic block diagram of a server according to an embodiment of the present disclosure.

FIG. 11 is a schematic block diagram of a server according to an embodiment of the present disclosure.

As illustrated in FIG. 11, the server includes a processor 71, a memory 72, a communication interface 73, and a bus 74.

The processor 71, the memory 72 and the communication interface 73 are connected and communicate with each other via the bus 74. Executable program codes are stored in the memory 72. The processor 71 is configured to run a program corresponding to the executable program codes by reading the executable program codes stored in the memory 72, for implementing the remote control method of an automatic driving vehicle according to the above embodiments.

With the server according to the embodiments of the present disclosure, after receiving a remote control request of an automatic driving vehicle, a control instruction is determined according to the remote control request and transmitted by using wireless channels corresponding to a plurality of wireless networks. Therefore, the control instruction is transmitted by using wireless channels corresponding to a plurality of different wireless networks, thereby realizing the redundant backup of the control instruction, avoiding the case that the automatic driving vehicle cannot receive the control instruction in time due to the instability of a single network, and improving the communication stability of communication with the automatic driving vehicle. In this way, the control instruction may reach the automatic driving vehicle in time, which enables the automatic driving vehicle to act rapidly in response to the control instruction and further improves the driving safety of the automatic driving vehicle.

Figure 12:
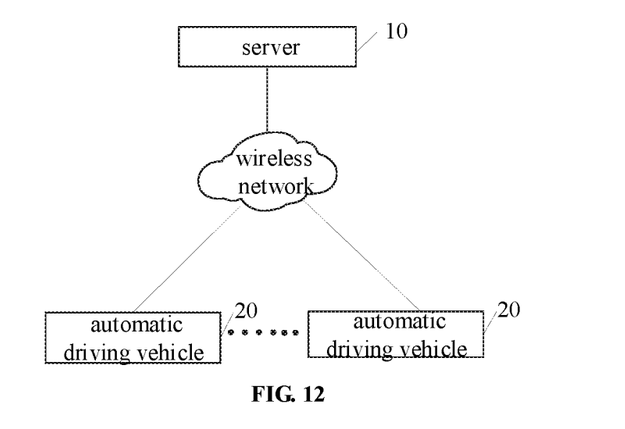
FIG. 12 is a schematic block diagram of a remote control system for an automatic driving vehicle according to an embodiment of the present disclosure.

FIG. 12 is a schematic block diagram of a remote control system for an automatic driving vehicle according to an embodiment of the present disclosure.

As illustrated in FIG. 12, the system includes a server 10 and an automatic driving vehicle 20.

The server 10 is configured to receive a remote control request transmitted by the automatic driving vehicle 20, to determine a control instruction according to the information carried by the remote control request, and to transmit the control instruction to the automatic driving vehicle 20 by using wireless channels corresponding to a plurality of wireless networks.

The automatic driving vehicle 20 is configured to transmit the remote control request to the server, and to receive the control instruction transmitted by the server.

It should be noted that the foregoing illustration of the embodiments of the remote control method and device for the automatic driving vehicle is also applicable to the remote control system for the automatic driving vehicle according to this embodiment, and details are not described herein again.

With the remote control system for an automatic driving vehicle according to embodiments of the present disclosure, after receiving a remote control request of an automatic driving vehicle, a control instruction is determined according to the remote control request, and the control instruction is transmitted by using wireless channels corresponding to a plurality of wireless networks. Thus, the control instruction is transmitted through the wireless channels corresponding to the plurality of different wireless networks, thereby realizing the redundant backup of the control instruction, avoiding the case that the automatic driving vehicle cannot receive the control instruction in time due to the instability of a single network, and improving the communication stability of communication with the automatic driving vehicle. In this way, the control instruction may reach the automatic driving vehicle in time, which enables the automatic driving vehicle to act rapidly in response to the control instruction, and further improves the driving safety of the automatic driving vehicle.

In order to achieve the above embodiments, the present disclosure further provides a non-transitory computer readable storage medium. When instructions in the storage medium are executed by a processor, the remote control method for an automatic driving vehicle according to the embodiments of the present disclosure is implemented.

In order to achieve the above embodiments, the present disclosure further provides a computer program product. When instructions in the computer program product are executed by a processor, the remote control method for an automatic driving vehicle according to the embodiments of the present disclosure is implemented.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples may be combined by those skilled in the art.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A remote control method for an automatic driving vehicle, applied to a server and comprising:
receiving a remote control request transmitted by an automatic driving vehicle;
determining a control instruction based on information carried by the remote control request;
acquiring current geographic location information of the automatic driving vehicle based on the information carried by the remote control request;
acquiring a time when the remote control request is received by the server that communicates with the automatic driving vehicle via wireless networks;
determining a plurality of target wireless networks corresponding to the current geographic location information based on a pre-stored correspondence between geographic locations and the wireless networks, and determining a plurality of target wireless channels corresponding to the plurality of target wireless networks based on the time; and
transmitting the control instruction to the automatic driving vehicle by using the plurality of target wireless channels corresponding to the plurality of target wireless networks.

2. The method according to claim 1, further comprising:
acquiring current geographic location information of the automatic driving vehicle based on the information carried by the remote control request; and
screening the plurality of wireless networks according to the current geographic location information, to acquire a target wireless network corresponding to the current geographic location information;
wherein transmitting the control instruction to the automatic driving vehicle by using wireless channels corresponding to the plurality of wireless networks, comprises:
transmitting the control instruction to the automatic driving vehicle by using a wireless channel corresponding to the target wireless network.

3. The method according to claim 2, further comprising:
acquiring a time when the remote control request is received by the server; and
determining a target wireless channel corresponding to the target wireless network according to the current geographic location information and the time,
wherein transmitting the control instruction to the automatic driving vehicle by using a wireless channel corresponding to the target wireless network, comprises:
transmitting the control instruction to the automatic driving vehicle by using the target wireless channel corresponding to the target wireless network.

4. The method according to claim 1, further comprising:
acquiring current geographic location information of the automatic driving vehicle based on the information carried by the remote control request; and
wherein before transmitting the control instruction to the automatic driving vehicle by using wireless channels corresponding to the plurality of wireless networks, the method further comprises:
determining the wireless channel corresponding to each of the plurality of wireless networks based on the current geographic location information.

5. A remote control device for an automatic driving vehicle, comprising:
a processor; and
a memory, configured to store software modules executable by the processor, wherein the processor is configured to run a program corresponding to the software modules by reading the software modules stored in the memory, the software modules comprising:
a receiving module, configured to receive a remote control request transmitted by an automatic driving vehicle;
a first determining module, configured to determine a control instruction based on information carried by the remote control request;
a fifth acquiring module, configured to acquire current geographic location information of the automatic driving vehicle according to information carried by the remote control request;
a sixth acquiring module, configured to acquire a time when the remote control request is received by the remote control device that communicates with the automatic driving vehicle via wireless networks;
a fourth determining module, configured to determine a plurality of target wireless networks corresponding to the current geographic location information based on a pre-stored correspondence between geographic locations and wireless networks, and determine a plurality of target wireless channels corresponding to the plurality of target wireless networks based on the time; and
a transmitting module, configured to transmit the control instruction to the automatic driving vehicle by using the plurality of target wireless channels corresponding to the plurality of wireless networks.

6. The device according to claim 5, wherein the software modules further comprise:
a first acquiring module, configured to acquire current geographic location information of the automatic driving vehicle according to information carried by the remote control request; and
a second acquiring module, configured to screen the plurality of the wireless networks according to the current geographic location information, to acquire a target wireless network corresponding to the current geographic location information;
wherein the transmitting module is configured to transmit the control instruction to the automatic driving vehicle by using the wireless channel corresponding to the target wireless network.

7. The device according to claim 6, wherein the software modules further comprise:
a third acquiring module, configured to acquire a time when the remote control request is received by the remote control device; and
a second determining module, configured to determine a target wireless channel corresponding to the target wireless network according to the current geographic location information and the receiving time;
wherein the transmitting module is configured to transmit the control instruction to the automatic driving vehicle by using the target wireless channel corresponding to the target wireless network.

8. The device according to claim 5, wherein the software modules further comprise:
a fourth acquiring module, configured to acquire current geographic location information of the automatic driving vehicle according to information carried by the remote control request; and
a third determining module, configured to determine the wireless channel corresponding to each of the plurality of wireless networks based on the current geographic location information, before the transmitting module transmits the control instruction to the automatic driving vehicle by using the wireless channels corresponding to the plurality of wireless networks.

9. A non-transitory computer readable storage medium having a computer program stored thereon, wherein when the computer program is executed by a processor, a remote control method is implemented, the computer program comprising:
program codes causing receiving a remote control request transmitted by an automatic driving vehicle;
program codes causing determining a control instruction based on information carried by the remote control request;
program codes causing acquiring current geographic location information of the automatic driving vehicle based on the information carried by the remote control request;
program codes causing acquiring a time when the remote control request is received by a server that communicates with the automatic driving vehicle via wireless networks;
program codes causing determining a plurality of target wireless networks corresponding to the current geographic location information based on a pre-stored correspondence between geographic locations and wireless networks, and determining a plurality of target wireless channels corresponding to the plurality of target wireless networks based on the time; and program codes causing transmitting the control instruction to the automatic driving vehicle by using the plurality of target wireless channels corresponding to the plurality of target wireless networks.

10. The storage medium according to claim 9, wherein the computer program further comprises:

program codes causing acquiring current geographic location information of the automatic driving vehicle based on the information carried by the remote control request; and program codes causing screening the plurality of wireless networks according to the current geographic location information, to acquire a target wireless network corresponding to the current geographic location information;

wherein program codes causing transmitting the control instruction to the automatic driving vehicle by using wireless channels corresponding to the plurality of wireless networks, comprises:

program codes causing transmitting the control instruction to the automatic driving vehicle by using a wireless channel corresponding to the target wireless network.

11. The storage medium according to claim 10, wherein the computer program further comprises:

program codes causing acquiring a time when the remote control request is received by the server; and program codes causing determining a target wireless channel corresponding to the target wireless network according to the current geographic location information and the receiving time, wherein program codes transmitting the control instruction to the automatic driving vehicle by using a wireless channel corresponding to the target wireless network, comprises:

program codes causing transmitting the control instruction to the automatic driving vehicle by using the target wireless channel corresponding to the target wireless network.

12. The storage medium according to claim 9, wherein the computer program further comprises:

program codes causing acquiring current geographic location information of the automatic driving vehicle based on the information carried by the remote control request; and program codes causing determining the wireless channel corresponding to each of the plurality of wireless networks based on the current geographic location information before transmitting the control instruction to the automatic driving vehicle by using wireless channels corresponding to the plurality of wireless networks.

* * * * *